US012792729B2

(12) United States Patent
Jin et al.

(10) Patent No.: US 12,792,729 B2
(45) Date of Patent: Nov. 10, 2026

(54) STORAGE DEVICE DETERMINING ATTACK FROM TENANT AND OPERATION METHOD OF THE STORAGE DEVICE

(71) Applicant: SAMSUNG ELECTRONICS CO., LTD., Suwon-si (KR)

(72) Inventors: Sang-Hwa Jin, Suwon-si (KR); Kyungkeun Lee, Suwon-si (KR); Bumjun Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 217 days.

(21) Appl. No.: 18/201,020

(22) Filed: May 23, 2023

(65) Prior Publication Data

US 2024/0078311 A1 Mar. 7, 2024

(30) Foreign Application Priority Data

Sep. 6, 2022 (KR) ........................ 10-2022-0112743

(51) Int. Cl.
*G06F 21/55* (2013.01)
*G06F 21/54* (2013.01)

(52) U.S. Cl.
CPC ............ *G06F 21/554* (2013.01); *G06F 21/54* (2013.01); *G06F 21/552* (2013.01)

(58) Field of Classification Search
CPC ...... G06F 21/554; G06F 21/54; G06F 21/552; G06F 21/55; G06F 21/577; G06F 2221/031; G06F 2221/034; G06F 21/556; G06F 21/566; G06F 21/75; G06F 3/0659; H04L 63/1408; H04L 63/1441; H04L 63/20; H04L 51/212; H04L 63/1416; H04L 63/1466; H04L 63/1491
See application file for complete search history.

(56) References Cited

U.S. PATENT DOCUMENTS

| | | | | |
|---|---|---|---|---|
| 7,424,741 | B1 * | 9/2008 | Grimm | H04L 63/1458 726/13 |
| 9,438,624 | B2 * | 9/2016 | Fine | H04L 63/1466 |
| 9,721,093 | B2 | 8/2017 | Poornachandran et al. | |
| 10,216,932 | B2 | 2/2019 | Kim et al. | |
| 10,270,586 | B2 | 4/2019 | Moss | |
| 10,511,433 | B2 | 12/2019 | Courtney | |
| 10,706,147 | B1 * | 7/2020 | Pohlack | H04L 63/1416 |
| 10,771,236 | B2 | 9/2020 | Courtney | |

(Continued)

OTHER PUBLICATIONS

Tan, et al., "Invisible Probe: Timing Attacks with PCIe Congestion Side-channel", 2021, IEEE Symposium on Security and Privacy, 17 pages total.

(Continued)

*Primary Examiner* — Wasika Nipa
*Assistant Examiner* — Edgar W Xie
(74) *Attorney, Agent, or Firm* — Sughrue Mion, PLLC

(57) ABSTRACT

A method includes: receiving, by a storage device, a plurality of read commands generated by a tenant from a host; calculating, based on the plurality of read commands satisfying a predetermined condition, each latency of the plurality of read commands and obtaining the calculated plurality of latencies; calculating a uniformity of the plurality of latencies; and determining, based on the uniformity that is within a predetermined ratio range, that there is an attack from the tenant.

18 Claims, 14 Drawing Sheets

(56) References Cited

U.S. PATENT DOCUMENTS 10,783,281 B2 9/2020 Trikalinou et al.
11,030,314 B2 6/2021 Kucherov et al.
11,095,758 B2 8/2021 Masputra et al.
2012/0084424 A1* 4/2012 Huang ................ G06F 11/3006 709/223
2014/0282849 A1* 9/2014 Collison ............... H04W 12/68 726/1
2015/0117198 A1* 4/2015 Menezes ............... H04L 47/805 370/235
2015/0341383 A1* 11/2015 Reddy ................. H04L 63/0876 726/22
2015/0347327 A1* 12/2015 Blaine ..................... G06F 13/18 710/6
2018/0101376 A1* 4/2018 Olarig ....................... G06F 8/63
2018/0284989 A1* 10/2018 Kachare .................. G06F 13/28
2018/0288090 A1* 10/2018 Olarig ................. H04L 63/1458
2018/0295144 A1 10/2018 Jackson
2019/0158371 A1* 5/2019 Dillon ................... H04L 47/196
2019/0188376 A1 6/2019 Marcu et al.
2019/0251298 A1* 8/2019 Zhu ......................... G06F 21/57
2019/0348089 A1 11/2019 Hasbun et al.
2019/0348090 A1 11/2019 Hasbun et al.
2020/0004451 A1* 1/2020 Prohofsky ............. G06F 3/0604
2020/0265137 A1 8/2020 Yoon et al.
2020/0294562 A1 9/2020 Hasbun et al.
2020/0326885 A1* 10/2020 Wozniak ............... G06F 3/0659
2020/0327258 A1 10/2020 Marcu et al.
2020/0394302 A1* 12/2020 Nashimoto ............ G01C 21/16
2021/0064745 A1 3/2021 Bouguerra et al.
2021/0216648 A1* 7/2021 Child .................... G06F 21/604
2022/0224615 A1* 7/2022 Xiao ................... H04L 43/0817
2022/0246186 A1 8/2022 Hasbun et al.

OTHER PUBLICATIONS

Communication issued Jan. 19, 2024 by the European Patent Office in European Patent Application No. 23180932.8.

* cited by examiner

STORAGE DEVICE DETERMINING ATTACK FROM TENANT AND OPERATION METHOD OF THE STORAGE DEVICE

CROSS-REFERENCE TO RELATED APPLICATION

This application claims priority to and the benefit of Korean Patent Application No. 10-2022-0112743 filed in the Korean Intellectual Property Office on Sep. 6, 2022, the entire contents of which are incorporated herein by reference.

BACKGROUND

1. Field

The present disclosure relates to an attack detection method, an attack response method, and a storage device.

2. Description of the Related Art

Although there is a growing demand to install more peripherals on a single machine, a Peripheral Component Interconnect Express (PCIe) interface provided by a host is limited. To solve this, Input/Output (I/O) switches such as a PCIe switch, a Platform Controller Hub (PCH), and a virtualization card are installed in the machine, allowing peripheral devices to share a limited PCIe interface.

However, when congestion occurs due to saturation of PCIe link capacity of the host due to PCIe traffic of the peripheral devices, information of other tenants may be leaked due to transmission delay.

SUMMARY

According to an aspect of the present disclosure, a method includes: receiving, by a storage device, a plurality of read commands generated by a tenant from a host; calculating, based on the plurality of read commands satisfying a predetermined condition, each latency of the plurality of read commands and obtaining the calculated plurality of latencies; calculating a uniformity of the plurality of latencies; and determining, based on the uniformity that is within a predetermined ratio range, that there is an attack from the tenant.

According to another aspect of the present disclosure, a method includes: determining that a command received from a host is an attack by using In-Band (IB) communication; adjusting a latency of the command; and sending, to the host, at least one of an attack detection command to inform that an attack has been detected or a latency adjustment command to inform the host that the latency has been adjusted, by using Out-Of-Band (OOB) communication.

According to another aspect of the present disclosure, a storage device includes: an attack detector configured to determine an attacking tenant from among a plurality of tenants connected to a host based on a determination that there is an attack from the host; a budget calculator configured to calculate a latency range of the attacking tenant based on a service policy of the host; and a latency adjuster configured to adjust a latency for the attacking tenant based on the latency range.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
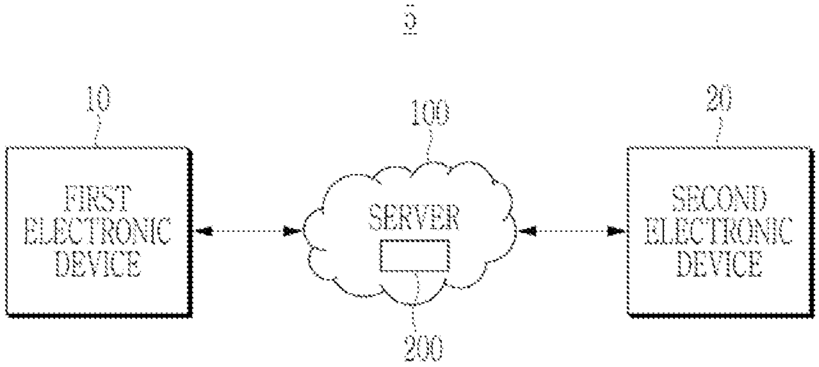
FIG. 1 illustrates a schematic block diagram of an electronic system according to an embodiment.

The present disclosure will be described more fully hereinafter with reference to the accompanying drawings, in which embodiments are shown. As those skilled in the art would realize, the described embodiments may be modified in various different ways, all without departing from the spirit or scope of the present disclosure.

Accordingly, the drawings and description are to be regarded as illustrative in nature and not restrictive. Like reference numerals designate like elements throughout the specification. In the flowcharts described with reference to the drawings in this specification, the operation order may be changed, various operations may be merged, certain operations may be divided, and certain operations may not be performed.

In addition, a singular form may be intended to include a plural form as well, unless the explicit expression such as "one" or "single" is used. Terms including ordinal numbers such as first, second, and the like will be used only to describe various constituent elements, and are not to be interpreted as limiting these constituent elements. These terms may be used for a purpose of distinguishing one component from other components.

FIG. 1 illustrates a schematic block diagram of an electronic system according to an embodiment. In FIG. 1, an electronic system 5 may include a first electronic device 10, a second electronic device 20, and a server 100.

The server 100 may manage a plurality of tenants. The plurality of tenants may respectively correspond to a plurality of users. Alternatively, the plurality of tenants may respectively correspond to a plurality of electronic devices. For example, a first tenant of the plurality of tenants may access the server 100 by using the first electronic device 10, and a second tenant of the plurality of tenants may access the server 100 by using the second electronic device 20.

Each of the first electronic device 10 and the second electronic device 20 may be a Personal Computer (PC) having a display, or a portable electronic device. Here, the portable electronic device may be implemented as a laptop computer, a mobile phone, a smart phone, a tablet PC, a Mobile Internet Device (MID), a Personal Digital Assistant (PDA), an Enterprise Digital Assistant (EDA), or a wearable device. The wearable device may include a smart watch, a smart band, and smart glasses.

The first electronic device 10 and the second electronic device 20 may communicate with the server 100 to use components of the server 100. For example, the components of the server 100 may include a Graphics Processing Unit (GPU), a Neural Processing Unit (NPU), a Tensor Processing Unit (TPU), a Network Interface Card (NIC), a memory device, a storage device, and the like. The NIC may include an Ethernet NIC, a Remote Direct Memory Access (RDMA) NIC, and the like. The memory device is a Dynamic Random Access Memory (DRAM), and may include a Compute Express Link (CXL) DRAM operating based on a Peripheral Component Interconnect Express (PCIe) interface. The storage device may include a Solid State Drive (SSD) device capable of processing input/output (I/O) through an I/O switch. For example, the SSD device may be a Non-Volatile Memory Express (NVMe) SSD, a CXL SSD, a CXL computational SSD (also referred to as a smart SSD), or the like.

The server 100 may communicate with the first electronic device 10 or the second electronic device 20 by using a network. The network may be a connection structure capable of exchanging information between nodes such as devices and servers. For example, the network may include a Radio Frequency (RF), a 3rd Generation Partnership Project (3GPP) network, a Long Term Evolution (LTE) network, a 5th Generation Partnership Project (5GPP) network, a World Interoperability for Microwave Access (WIMAX) network, Internet, a Local Area Network (LAN), a wireless LAN, a Wide Area Network (WAN), a Personal Area Network (PAN), a Value Added Network (VAN), a Bluetooth network, a Near Field Communication (NFC) network, a satellite broadcasting network, an analog broadcast network, A Digital Multimedia Broadcasting (DMB) network, and the like, but is not limited thereto.

In one embodiment, the first tenant may be a normal tenant (victim), and the second tenant may be an attacking tenant (attacker). The first electronic device 10 may use a first component of the server 100 as the first tenant. The second electronic device 20 may use a second component of the server 100 as the second tenant. The first component used by the first electronic device 10 and the second component used by the second electronic device 20 may be connected to a host of the server 100 through an I/O switch. The I/O switch may extend PCIe support of the host. That is, the first component and the second component may share a PCIe link of the host. The I/O switch may be an interconnector based on the PCIe, and may be implemented as a PCIe switch, a CXL switch, a Platform Controller Hub (PCH), a virtualization card, or the like.

The second electronic device 20 may perform a side-channel attack by making the PCIe link congested (busy). The second electronic device 20 may saturate the PCIe link capacity by generating aggregated PCIe traffics. For example, the second electronic device 20 may request the host to send a continuous command to the second component. The host may fill a transmission queue that it sends to the second component with a command. The second electronic device 20 may obtain information on the first component used by the first electronic device 10 by measuring latency for the command. The latency may mean a processing time of a command.

The server 100 may include a defense device 200 capable of detecting and responding to a side-channel attack. After detecting and responding to the side-channel attack, the defense device 200 may notify the host of the attack detection and attack response.

In one embodiment, the defense device 200 may be included in the I/O switch or I/O device of the server 100. In this case, the I/O device may be a GPU, an NPU, a TPU, a Network Interface Card (NIC), or the like. The defense device 200 may determine whether a command received through In-Band (IB) communication is an attack, and when it corresponds to the attack, the defense device 200 may notify the host of the attack detection and attack response through the IB communication. The IB communication may correspond to a communication through the PCIe link. A processor of the host may perform the IB communication. That is, the defense device 200 may notify the processor of the host of the attack detection and attack response. An embodiment in which the defense device 200 is included in the I/O device will be described later with reference to FIG. 3, FIG. 4, and FIG. 8.

In one embodiment, the defense device 200 may be included in a memory device or a storage device of the server 100. The defense device 200 may determine whether a command received through the IB communication is an attack, and when it corresponds to the attack, the defense device 200 may notify the host of the attack detection and attack response through Out-Of-Band (OOB) communication. The OOB communication may correspond to a communication through a System Management Bus (SMBus), an inter-integrated circuit (I2C) protocol, or an improved inter integrated circuit (I3C) protocol. A baseboard management controller (BMC) of the host may perform the OOB communication. That is, the defense device 200 may notify the BMC of the host of the attack detection and attack response. An embodiment in which the defense device 200 is included in the storage device will be described later with reference to FIG. 5 to FIG. 7, FIG. 9, and FIG. 10.

Figure 2:
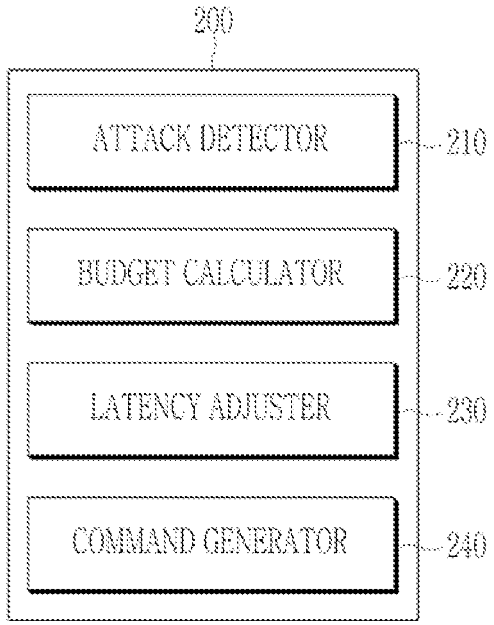
FIG. 2 illustrates a schematic block diagram of a defense device according to an embodiment.

FIG. 2 illustrates a schematic block diagram of a defense device according to an embodiment. In FIG. 2, the defense device 200 may include an attack detector 210, a budget calculator 220, a latency adjuster 230, and a command generator 240.

The attack detector 210 may determine whether a command from the host is an attack. For example, the attack detector 210 may detect an attack training pattern and an attack I/O pattern. The attack detector 210 may determine whether there is an attack when at least one of the attack training pattern or the attack I/O pattern is detected.

The attack training pattern may indicate a pattern in which there is a data transmission having a plurality of settings, thereby causing periodic latency. The data having the plurality of settings may indicate data having different traffic volumes. Taking a command as an example, the data having the plurality of settings may indicate a plurality of commands having the same command type but different volumes. An attacker may find a data transmission setting that generates a desired traffic volume and maintains a high and stable sampling rate through an attack training pattern. That is, the attack detector 210 may determine whether an attack training pattern has been received when periodically receiving data having a plurality of settings for finding a uniform latency. For example, the attack detector 210 may determine that an attack training pattern has been received when periodically and continuously receiving read commands having different volumes.

The attack I/O pattern may indicate a pattern in which commands are continuously received with the data transmission setting found in the attack training pattern for a predetermined period, and uniformity of latencies of the commands is within a predetermined ratio. The successive reception of commands may indicate that a transmission queue of the host is filled with a plurality of commands with the same command type and the same volume. For example, the attack detector 210 may continuously receive 4 kilobyte (kB) read commands among read commands having different volumes in the transmission queue of the host. The attack detector 210 may measure latencies of the 4 kB read commands, and may determine whether uniformity of the latencies is within a predetermined ratio (for example, 5 to 10%). The attack detector 210 may remove noise when measuring latencies. For example, when the storage device performs an internal operation during command processing, the attack detector 210 may remove the corresponding latency. As another example, when there is a write command between the 4 kB read commands, the attack detector 210 may remove the corresponding latency. The attack detector 210 may determine that an attack I/O pattern has been received when the uniformity of the latencies is within a predetermined ratio. The attacker may obtain victim's information through the attack I/O pattern.

In FIG. 2, the budget calculator 220 may determine a latency range for each tenant. The latency range may include a minimum latency and a maximum latency. The budget calculator 220 may determine a latency range based on a service policy designated by the host. The service policy may include tenant priority, bandwidth, timeout limit, and the like. For example, the budget calculator 220 may determine the maximum latency for the command of the second electronic device 20 (second tenant) to be 10 seconds based on a timeout limit designated by the host.

In FIG. 2, the latency adjuster 230 may adjust the latency in response to the command of the attacker. The latency adjuster 230 may adjust the latency within the latency range determined by the budget calculator 220. For example, the component including the defense device 200 may process the command of the second electronic device 20 in 5 seconds. In this case, the latency adjuster 230 may adjust the latency within 10 seconds determined by the budget calculator 220 and send it to the host, without directly sending the processing result to the host.

In FIG. 2, the command generator 240 may generate a command to be sent to the host. The command generator 240 may generate at least one of an attack detection command, a latency adjustment command, and a priority adjustment command. The attack detection command may be a command for notifying that an attack has been detected. The latency adjustment command may be a command for notifying that the latency of the attacker's command has been adjusted in response to the attacker's attack. The priority adjustment command may be a command for notifying that the priority of the attacker has been adjusted in response to the attacker's attack. The server may define a priority as a service policy for a plurality of tenants, and may adjust the priority of a tenant determined as an attacker. The command generator 240 may generate a command according to the component type to which the defense device 200 belongs.

In one embodiment, when the defense device 200 belongs to the storage device of the server 100, the command generator 240 may generate a command of a Non-Volatile Memory Express-Management Interface (NVMe-MI) standard. In this case, the defense device 200 may send a command to the host by using one of a SMBus, an I2C protocol, or an I3C protocol.

In one embodiment, when the defense device 200 belongs to an I/O device such as a GPU or an NIC of the server 100, the command generator 240 may generate a command of the PCIe standard. In this case, the defense device 200 may send a command to the host by using the PCIe protocol.

FIG. 1 illustrates that the server 100 communicates with the first electronic device 10 and the second electronic device 20, but the present disclosure is not limited thereto. For example, the server 100 may include three or more tenants, and the tenants may be implemented by using their respective electronic devices to communicate with the server 100.

Figure 3:
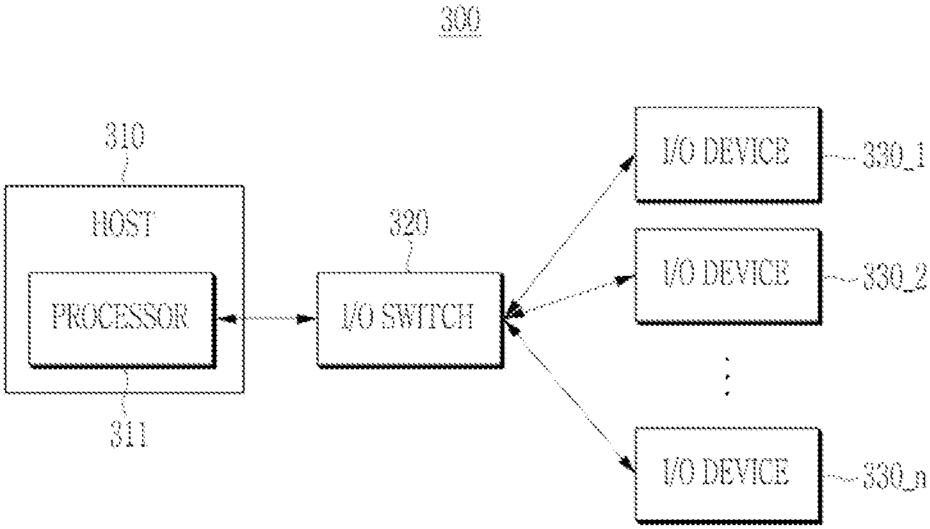
FIG. 3 illustrates a schematic block diagram of a server according to an embodiment.
Figure 4:
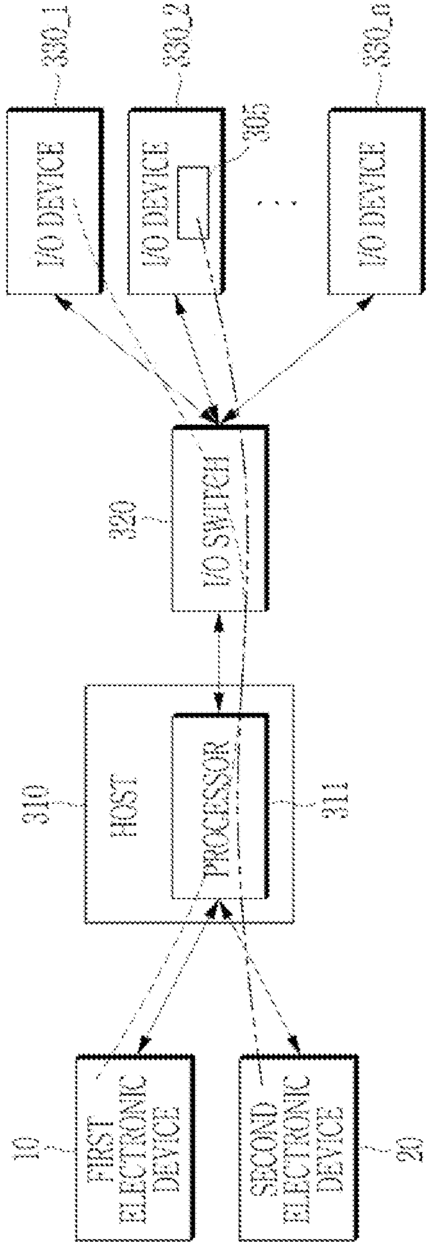
FIG. 4 illustrates a drawing for explaining an example of an attack that may occur in the server of FIG. 3.

FIG. 3 illustrates a server according to an embodiment, and FIG. 4 illustrates an example of an attack that may occur in the server of FIG. 3.

In FIG. 3, according to an embodiment, a server 300 may include a host 310, an I/O switch 320, and a plurality of I/O devices 330_1 to **330_*n***. Here, n may be an integer greater than 1.

The host 310 may include a processor 311 that manages and controls overall operations of the server 300. The processor 311 may receive a command from a tenant, may process the command by using the I/O switch 320 and at least one of the plurality of I/O devices 330_1 to **330_*n***, and may send the processing result to the tenant.

The processor 311 may be connected to the plurality of I/O devices 330_1 to **330_*n* through the I/O switch 320. In one embodiment, there may be an I/O device directly connected to the processor 311 without using the I/O switch 320**.

The I/O switch 320 may extend PCIe support of the host 310. The processor 311 and the I/O switch 320 may be connected by a PCIe link, and the I/O switch 320 and the plurality of I/O devices 330_1 to **330_*n* may be connected by a PCIe link. That is, the plurality of I/O devices 330_1 to 330_*n* may share the PCIe link of the host 310. In this case, a port through which the I/O switch 320 is connected to the host 310 may be referred to as an upstream port, and a port connected to the plurality of I/O devices 330_1 to 330_*n*** may be referred to as a downstream port.

The plurality of I/O devices 330_1 to **330_*n*** may be a GPU, an NPU, a TPU, an NIC, a storage device, and the like. For example, the tenant may use an Artificial Intelligence (AI) function through an I/O device that is a GPU. The tenant may use a web search function through an I/O device that is an NIC. The tenant may read, delete, or write data through an I/O device that is a storage device.

The server 300 may detect and respond to an attack of the second tenant by using the defense device 200 described with reference to FIG. 1 and FIG. 2, and may report it to the processor 311. Here, the attack may be a side-channel attack.

In one embodiment, the I/O switch 320 may include the defense device 200. That is, the I/O switch 320 may detect and respond to an attack, and may report it to the processor 311.

In one embodiment, at least one of the plurality of I/O devices 330_1 to **330_*n* may include the defense device 200. That is, the I/O device including the defense device 200 may detect and respond to an attack, and may report it to the processor 311**.

In FIG. 4, a scenario in which two tenants use the server 300 of FIG. 3 may be confirmed. The two tenants may include a first tenant that is a normal tenant, and a second tenant that is an attacking tenant.

The first tenant may get access to the server 300 by using the first electronic device 10 to use the first I/O device 330_1. For example, the first I/O device 330_1 may be a GPU, and the first tenant may use an AI function by using the first I/O device 330_1.

The second tenant may use the second electronic device 20 to get access to the server 300 to use the second I/O device 330_2. For example, the second I/O device 330_2 may be an RDMA NIC, and the second tenant may use the second I/O device 330_2 to access a memory area.

The second I/O device 330_2 may include a defense device 305 that detects and responds to an attack and reports it to the processor 311. The defense device 305 may have substantially the same configuration and operation as the defense device 200 of FIG. 1 and FIG. 2.

The defense device 305 may determine whether the command received by the second I/O device 330_2 is an attack. The second I/O device 330_2 may receive a command through the PCIe link. For example, the defense device 305 may detect an attack training pattern and an attack I/O pattern of the second tenant. When the defense device 305 detects at least one of the attack training pattern and the attack I/O pattern, the defense device 305 may determine that there is an attack. The defense device 305 may notify the processor 311 that there is an attack. The defense device 305 may notify the processor 311 that there is an attack through the PCIe link. The configuration and operation of the defense device 305 is the same as the configuration and operation of the defense device 200 described with reference to FIG. 2, so a detailed description thereof will be omitted.

The defense device 305 may determine an attacker based on the attack. The defense device 305 may detect at least one of the attack training pattern and the attack I/O pattern, and may determine a subject of an attack command. The defense device 305 may notify the processor 311 of an attacker or an attacker's identification.

For example, the defense device 305 may determine that at least one of the attack training pattern or the attack I/O pattern originates from the second electronic device 20 that is a second tenant. The defense device 305 may notify the processor 311 that the second tenant is the attacker.

The processor 311 may determine whether the second tenant is a real attacker. For example, the processor 311 may determine whether the attacker determined by the defense device 305 is a real attacker based on tenant information. The tenant information may include reliability of the tenant, and the like. When the processor 311 determines that the second tenant is a real attacker, it may operate based on a defense policy. When the processor 311 determines that the second tenant is not a real attacker, it may ignore the notification of the defense device 305.

The defense device 305 may respond to the attack. The defense device 305 may determine a latency range of the second tenant determined to be an attacker based on the service policy of the host 310. The latency range may include a minimum latency and a maximum latency. The service policy may include tenant priority, bandwidth, timeout limit, and the like. For example, the defense device 305 may determine the maximum latency for the second tenant to be 10 seconds based on the timeout limit.

The defense device 305 may adjust the latency for the second tenant based on the latency range. For example, even if the second I/O device 330_2 processes the command of the second tenant in only 5 seconds, as the defense device 305 adjusts the latency within 10 seconds, the processing result may not be directly sent to the processor 311.

FIG. 4 illustrates that the second I/O device 330_2 includes the defense device 305, but the present disclosure is not limited thereto, and other I/O devices (330_1, **330_*n*, . . . ) may include the defense device 305**.

Figure 5:
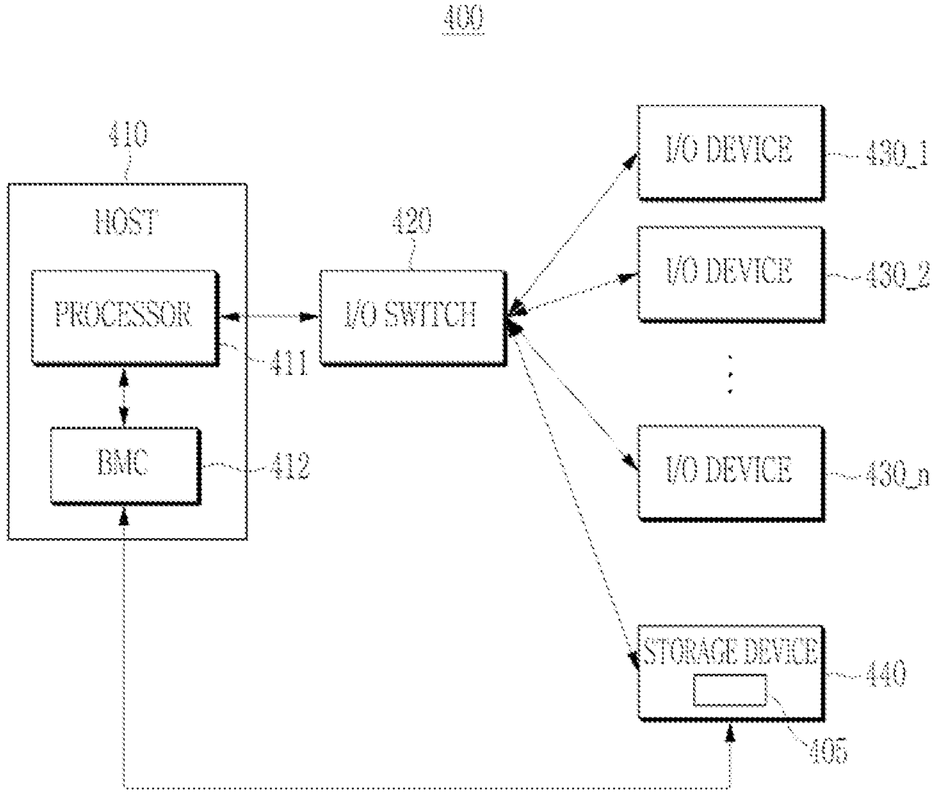
FIG. 5 illustrates a schematic block diagram of a server according to an embodiment.
Figure 6:
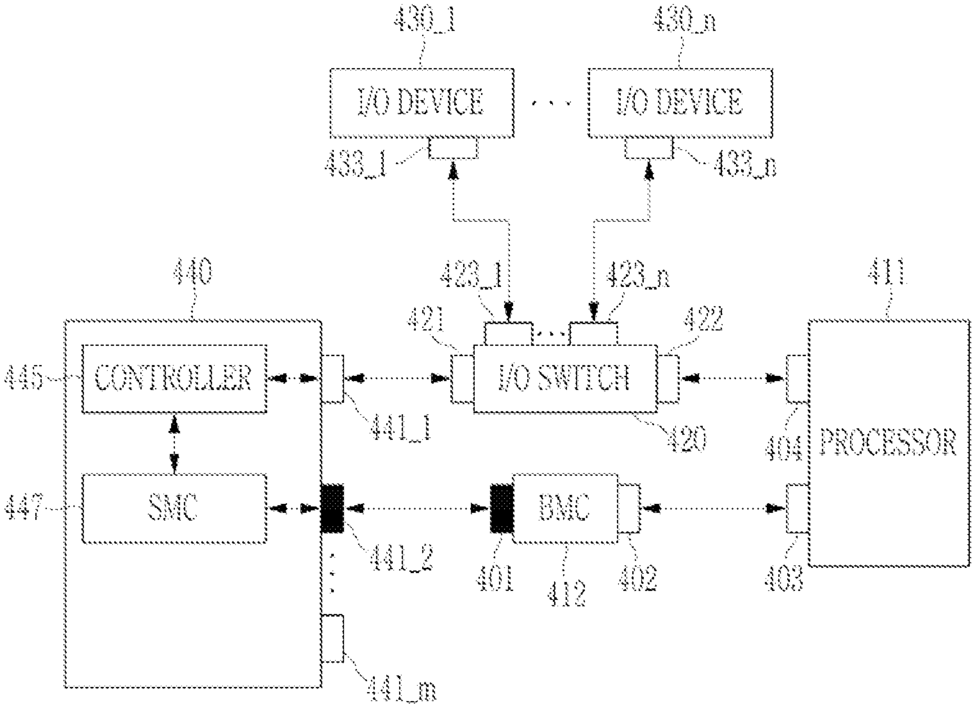
FIG. 6 illustrates a drawing for explaining an operation of a storage device according to an embodiment.
Figure 7:
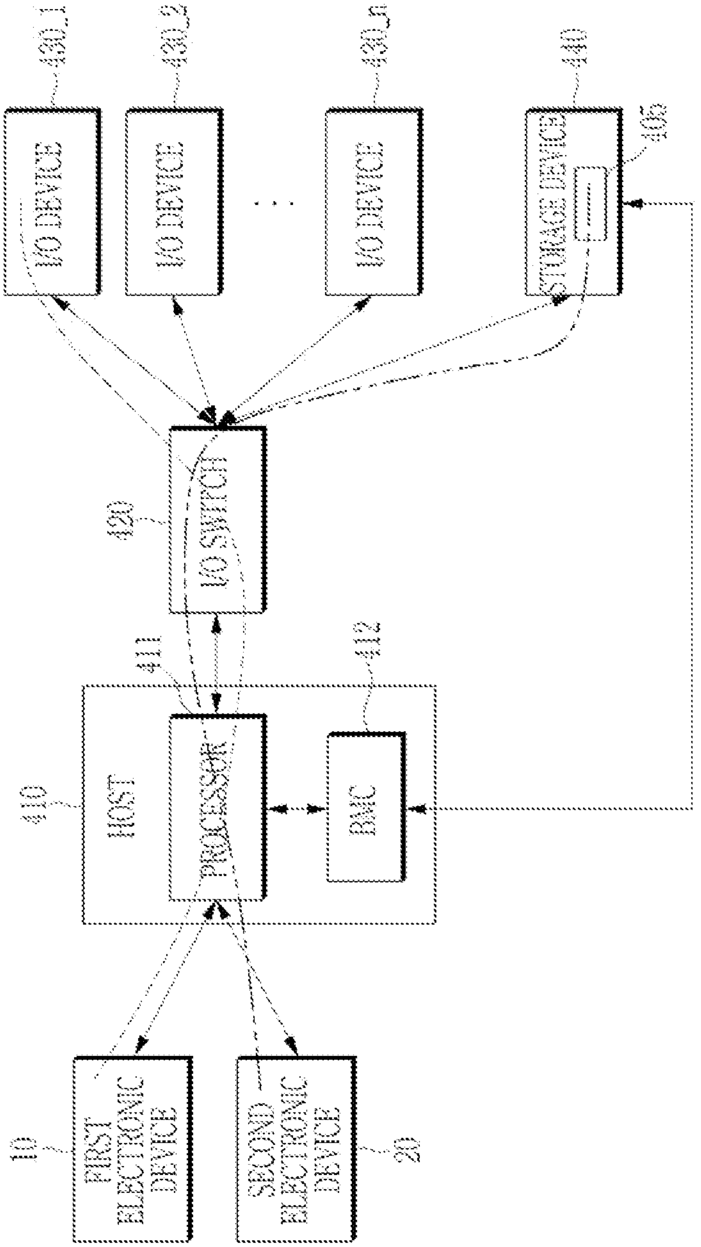
FIG. 7 illustrates a drawing for explaining an example of an attack that may occur in the server of FIG. 5.
Figure 8:
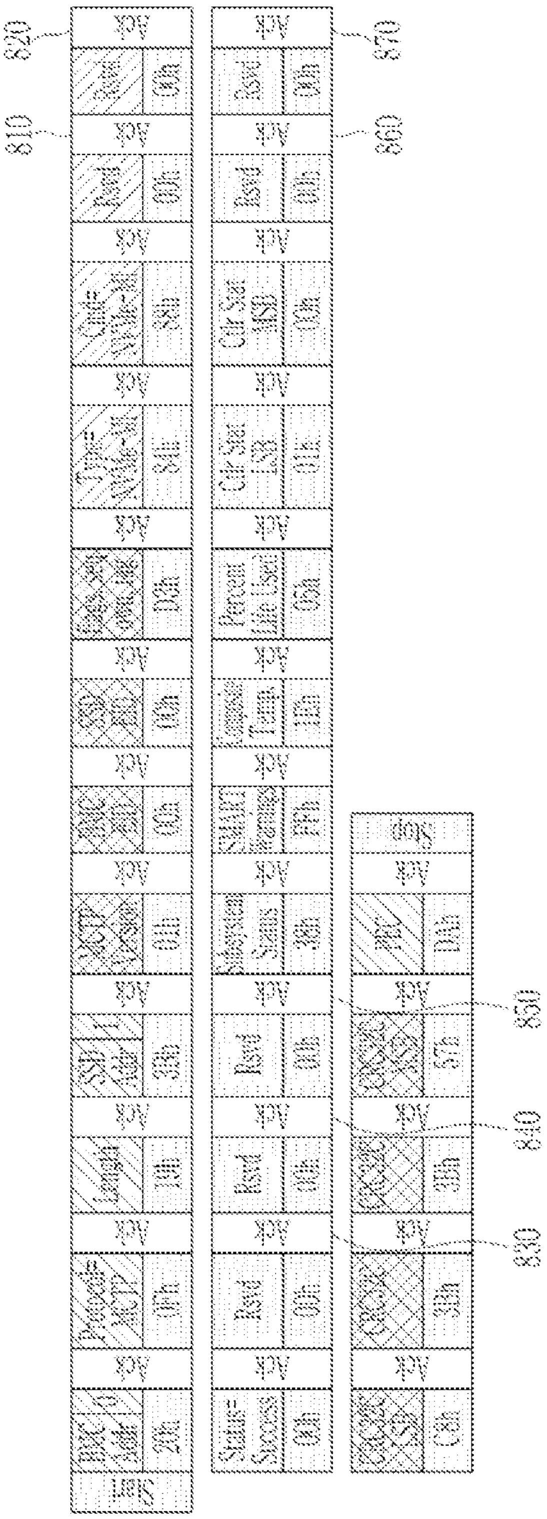
FIG. 8 illustrates a command of a storage device according to an embodiment.

FIG. 5 illustrates a schematic block diagram of a server according to an embodiment. FIG. 6 illustrates a drawing for explaining an operation of a storage device according to an embodiment. FIG. 7 illustrates a drawing for explaining an example of an attack that may occur in the server of FIG. 5. FIG. 8 illustrates a command of a storage device according to an embodiment.

In FIG. 5, according to an embodiment, a server 400 may determine an attacker in substantially the same manner as the server 100 of FIG. 1 and perform a response operation against the attack.

The server 400 may include a host 410, an I/O switch 420, a plurality of I/O devices 430_1 to **430_*n*, and a storage device 440**. Here, n may be an integer greater than one (1).

The host 410 may include a processor 411 that manages and controls overall operations of the server 400 and a BMC 412 (that is a management subsystem) that monitors and manages system hardware. The processor 411 may perform IB communication, and the BMC 412 may perform OOB communication. The processor 411 and the BMC 412 may independently operate. Accordingly, the BMC 412 may operate without affecting the operation of the processor 411, and may operate even when the processor 411 is unavailable.

The processor 411 may receive a command from a tenant, may process the command by using at least one of the I/O switch 420, the plurality of I/O devices 430_1 to **430_*n*, and the storage device 440**, and may send the processing result to the tenant.

The processor 411 may be connected to the plurality of I/O devices 430_1 to **430_*n* and the storage device 440 through the I/O switch 420. In one embodiment, there may be an I/O device directly connected to the processor 411 without using the I/O switch 420**.

The I/O switch 420 may extend PCIe support of the host 410. The processor 411 and the I/O switch 420 may be connected by one PCIe link. The I/O switch 420, the plurality of I/O devices 430_1 to **430_*n*, and the storage device 440 may be connected by other PCIe links. That is, the plurality of I/O devices 430_1 to 430_*n* and the storage device 440 may share the PCIe link of the host 410**.

The plurality of I/O devices 430_1 to **430_*n*** may be a GPU, an NPU, a TPU, an NIC, a storage device, and the like. For example, the tenant may use an AI function through an I/O device that is a GPU. The tenant may use a web search function through an I/O device that is an NIC. The tenant may read, delete, or write data through an I/O device that is a storage device.

The storage device 440 may be connected to the BMC 412. That is, the storage device 440 may perform IB communication with the processor 411 and the I/O switch 420, and may perform OOB communication with the BMC 412.

In FIG. 6, the connection relationship between the components of the server 400 may be confirmed. The storage device 440 may include a controller 445, a Satellite Management Controller (SMC) 447, and a plurality of ports 441_1 to **441_*m*. Here, m may be an integer greater than 1. The I/O switch 420 may include a plurality of ports 421, 422, and 423_1 to 423_*n*. Here, the port 422 may be an upstream port connected to the processor 411 of the host 410. The ports 421 and 423_1 to 423_*n* may be downstream ports connecting the plurality of I/O devices 430_1 to 430_*n* and the storage device 440. The BMC 412 may include a plurality of ports 401 and 402. The processor 411 may include a plurality of ports 403 and 404. Each of the plurality of I/O devices 430_1 to 430_*n* may include a port 433_1 to 433_*n***.

In one embodiment, the ports 402, 403, 404, 421, 422, 423_1 to **423_*n*, and 433_1 to 433_*n*, 441_1 may be PCIe ports. In one embodiment, the ports 401 and 441_2** may be SMBus ports, I2C protocol ports, or I3C protocol ports.

The controller 445 of the storage device 440 may perform IB communication with the I/O switch 420 and the processor 411 through the port 441_1. The port 441_1 and the port 421 may be connected to form a PCIe link. In addition, the port 404 and the port 422 may be connected to form a PCIe link.

The PCIe link between the port 404 and the port 422 may be easily congested by the controller 445 and the plurality of I/O devices 430_1 to **430_*n* due to limited PCIe support of the processor 411 of the host 410. The plurality of I/O devices 430_1 to 430_*n* may perform IB communication with the I/O switch 420 and the processor 411 through the plurality of ports 433_1 to 433_*n*. The plurality of ports 423_1 to 423_*n* and the plurality of ports 433_1 to 433_*n*** may be connected to each other to form a PCIe link. In this case, the attacker may obtain the victim's information by using the congestion of the PCIe link.

The SMC 447 may perform OOB communication with the BMC 412 of the host 410 through the port 441_2. The port 441_2 and the port 401 may be connected to form a Management Component Transport Protocol (MCTP) link. The SMC 447 may send status information, log information, device health information, and the like of the storage device 440 to the BMC 412. The status information of the storage device 440 may include whether an attack has occurred, whether to respond to an attack, and the like.

The SMC 447 and the controller 445 may independently operate. For example, even if the controller 445, main firmware, main power, internal power, and the like in the storage device 440 are abnormal, the SMC 447 may use a power source of the host 410 to send status information, log information, and device health information of the storage device 440 to the BMC 412. For example, the SMC 447 may use an auxiliary power source of the host 410.

The BMC 412 may perform IB communication with the processor 411 through the port 402. The port 402 and the port 403 may be connected to form a PCIe link.

The controller 445 and the SMC 447 may communicate with each other by using an internal bus of the storage device 440. In one embodiment, each component of the server 400 may further include a port as needed.

Referring back to FIG. 5, the storage device 440 may include a defense device 405. The defense device 405 may have substantially the same configuration and operation as the defense device 200 of FIG. 1 and FIG. 2.

In one embodiment, the defense device 405 of the storage device 440 may be included in the controller 445. In this case, the controller 445 may notify the SMC 447 of the attack detection and attack response based on an operation of the defense device 405. The SMC 447 may notify the BMC 412 of attack detection and attack response.

In one embodiment, the defense device 405 of the storage device 440 may be included in the controller 445. In this case, the SMC 447 may notify the BMC 412 of attack detection and attack response according to an operation of the defense device 405.

In one embodiment, the defense device 405 of the storage device 440 may be disposed outside of the controller 445 and the SMC 447. In this case, the defense device 405 may notify the SMC 447 of the attack detection and attack response. The SMC 447 may notify the BMC 412 of the attack detection and attack response.

In one embodiment, the defense device 405 of the storage device 440 may be implemented as firmware or software. The SMC 447 may notify the BMC 412 of attack detection and attack response according to an operation of the defense device 405.

In FIG. 7, a scenario in which two tenants use the server 400 of FIG. 5 may be confirmed. The two tenants may include a first tenant that is a normal tenant, and a second tenant that is an attacking tenant.

The first tenant may access the server 400 by using the first electronic device 10 to use the first I/O device 430_1. For example, the first I/O device 430_1 may be a GPU, and the first tenant may use an AI function by using the first I/O device 430_1.

The second tenant may use the second electronic device 20 to access the server 400 to use the storage device 440. For example, the second tenant may read or delete data of the storage device 440, or may write data to the storage device 440.

The storage device 440 may include the defense device 405 that detects and responds to an attack and reports it to the BMC 412. The defense device 405 may determine whether the command received by the storage device 440 is an attack. The storage device 440 may receive a command through a PCIe link. For example, the defense device 405 may detect an attack training pattern and an attack I/O pattern of the second tenant. When the defense device 405 detects at least one of the attack training pattern and the attack I/O pattern, the defense device 405 may determine that there is an attack. The configuration and operation of the defense device 405 are the same as the configuration and operation of the defense device 200 described with reference to FIG. 2, so a detailed description thereof will be omitted.

The defense device 405 may determine an attacker corresponding to the attack. The defense device 405 may detect at least one of the attack training pattern or the attack I/O pattern, and may determine a subject of an attack command. The defense device 405 may notify the BMC 412 of an attacker. The BMC 412 may notify the processor 411 of an attacker.

For example, the defense device 405 may determine that at least one of the attack training pattern or the attack I/O pattern originates from the second electronic device 20 of the second tenant. The defense device 405 may notify the BMC 412 that the second tenant is the attacker. The BMC 412 may notify the processor 411 that the second tenant is the attacker.

The defense device 405 may communicate with the BMC 412 by using SMBus, Intelligent Interface Controller (I2C), Improved Inter-Integrated Circuit (I3C) ports. That is, the defense device 405 may notify the BMC 412 of attack information by using one of a SMBus, an I2C protocol, and an I3C protocol. The attack information may include the presence of an attack, an attacker, an attack response method, and the like.

In this case, the defense device 405 may notify the BMC 412 of the attack information by using a command according to the NVMe-MI standard. In one embodiment, the command according to the NVMe-MI standard may be as shown in FIG. 8.

In FIG. 8, as an example of the command according to the NVMe-MI standard, the BMC 412 may send a Non-Volatile Memory (NVM) sub-system health status poll command to the SMC 447. Transmission bytes of the BMC 412 are highlighted with gray. In response to this, the SMC 447 may send a response to the NVM subsystem health status poll command to the BMC 412. The transmission byte, which is a response (Ack) of the SMC 447, is highlighted with white.

The SMC 447 may notify the BMC 412 of attack information by using at least one of reserved areas 810 to 870. The BMC 412 may notify the processor 411 of the attack information through the PCIe link.

The processor 411 may determine whether the second tenant is a real attacker. When the processor 411 determines that the second tenant is a real attacker, the processor 411 may operate based on a defense policy. When the processor 411 determines that the second tenant is not a real attacker, the processor 411 may ignore the notification of the defense device 405.

The defense device 405 may respond to an attack. The defense device 405 may determine a latency range of the second tenant determined to be an attacker based on the service policy of the host 410. The latency range may include a minimum latency and a maximum latency. The service policy may include tenant priority, bandwidth, timeout limit, and the like. For example, the defense device 405 may determine the maximum latency for the second tenant to be 10 seconds based on the timeout limit.

The defense device 405 may adjust the latency for the second tenant based on the latency range. For example, even if the storage device 440 processes the command of the second tenant in only 5 seconds, as the defense device 405 adjusts the latency within 10 seconds, the processing result may not be directly sent to the processor 411. The defense device 405 may notify the BMC 412 of the time the command is processed by reflecting the adjusted latency.

FIG. 5 and FIG. 7 illustrate that the storage device 440 includes the defense device 405, but the present disclosure is not limited thereto. For example, the I/O switch 420 may include the defense device 405, and/or at least one of the plurality of I/O devices 430_1 to **430_*n* may include the defense device 405. In addition, the storage device 440 described with reference to FIG. 5** may be replaced with a memory device.

Figure 9:
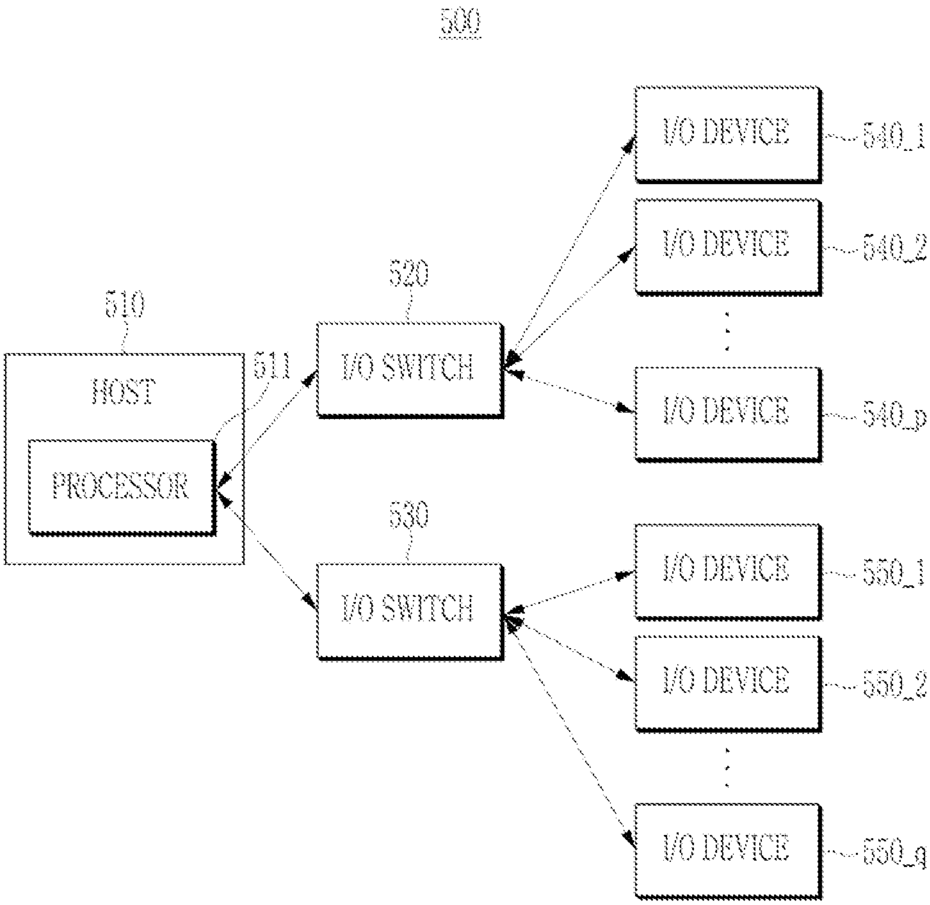
FIG. 9 illustrates a schematic block diagram of a server according to an embodiment.

FIG. 9 illustrates a schematic block diagram of a server according to an embodiment. In FIG. 9, according to an embodiment, a server 500 may include a host 510, I/O switches 520 and 530, and a plurality of I/O devices 540_1 to **540_*p* and 550_1 to 550_*q***. Here, p and q may be integers greater than 1.

The host 510 may include a processor 511 that manages and controls overall operations of the server 500. The processor 511 may receive a command from a tenant, may process the command by using at least one of the I/O switches 520 and 530 and at least one of the plurality of I/O devices 540_1 to **540_*p* and 550_1 to 550_*q***, and may send the processing result to the tenant.

As illustrated in FIG. 9, the processor 511 may be connected to the plurality of I/O devices 540_1 to **540_*p* through the I/O switch 520. The processor 511 may be connected to the plurality of I/O devices 550_1 to 550_*q* through the I/O switch 530. In one embodiment, there may be an I/O device directly connected to the processor 511 without using the I/O switches 520 and 530**.

The I/O switches 520 and 530 may extend the PCIe support of the host 510. The processor 511 and the I/O switches 520 and 530 may be connected by a PCIe link. The switches 520 and 530 and the plurality of I/O devices 540_1 to **540_*p* and 550_1 to 550_*q* may be connected by a PCIe link. That is, the plurality of I/O devices 540_1 to 540_*p* and 550_1 to 550_*q* may share the PCIe link of the host 510. In this case, a port connected to the host 510 in each of the I/O switches 520 and 530 may be referred to as an upstream port, and a port connected to the plurality of I/O devices 540_1 to 540_*p* and 550_1 to 550_*q*** may be referred to as a downstream port.

The plurality of I/O devices 540_1 to **540_*p* and 550_1 to 550_*q*** may be GPUs, NPUs, TPUs, NICs, storage devices, and the like. For example, the tenant may use an AI function through an I/O device that is a GPU. The tenant may use a web search function through an I/O device that is an NIC. The tenant may read, delete, or write data through an I/O device that is a storage device.

The server 500 may detect and respond to an attack of the attacking tenant by using the defense device 200 described with reference to FIG. 1 and FIG. 2, and may report it to the processor 511. Here, the attack may be a side-channel attack.

In one embodiment, at least one of the I/O switches 520 and 530 may include the defense device 200. That is, the I/O switch including the defense device 200 may detect and respond to an attack, and may report it to the processor 511.

In one embodiment, at least one of the plurality of I/O devices 540_1 to **540_*p* and 550_1 to 550_*q* may include the defense device 200. That is, the I/O device including the defense device 200 may detect and respond to an attack, and may report it to the processor 511**.

The defense device 200 may detect and respond to a side-channel attack of the PCIe link to which it belongs. For example, when the defense device 200 is in the I/O switch 530, the defense device 200 may detect and respond to the side-channel attack through the PCIe link between the processor 511 and the I/O switch 530. When the defense device 200 is in the I/O device 540_2, the defense device 200 may detect and respond to the side-channel attack through the PCIe link between the processor 511 and the I/O switch 520.

Figure 10:
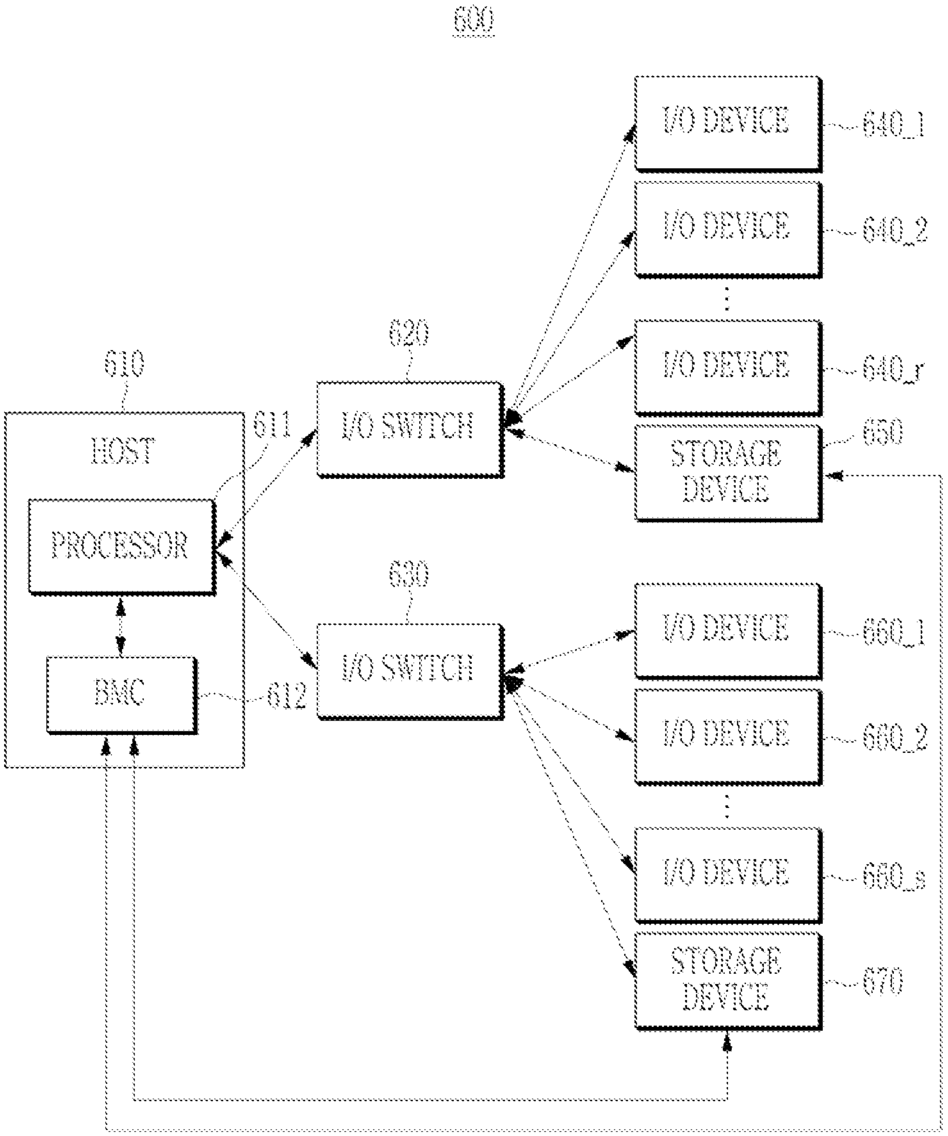
FIG. 10 illustrates a schematic block diagram of a server according to an embodiment.

FIG. 10 illustrates a schematic block diagram of a server according to an embodiment. In FIG. 10, according to an embodiment, the server 600 may be the same as the server 100 of FIG. 1.

The server 600 may include a host 610, I/O switches 620 and 630, a plurality of I/O devices 640_1 to **640_*r* and 660_1 to 660_*s*, and storage devices 650 and 660**. Here, r and s may be integers greater than 1.

The host 610 may include a processor 611 that manages and controls overall operations of the server 600 and a BMC 612 that is a management subsystem that monitors and manages system hardware. The processor 611 may perform IB communication, and the BMC 612 may perform OOB communication. The processor 611 and the BMC 612 may independently operate. Accordingly, the BMC 612 may operate without affecting the operation of the processor 611, and may operate even when the processor 611 is unavailable.

The processor 611 may receive a command from a tenant, may process a command by using at least one of the I/O switches 620 and 630 and at least one of the plurality of I/O devices 640_1 to **640_*r* and 660_1 to 660_*s* and the storage devices 650 and 660. The processor 611** may send the processing result to the tenant.

The processor 611 may be connected to the plurality of I/O devices 640_1 to **640_*r* and 660_1 to 660_*s* and the storage devices 650 and 660 through the I/O switches 620 and 630. In one embodiment, there may be an I/O device directly connected to the processor 611 without using the I/O switches 620 and 630**.

The I/O switches 620 and 630 may extend the PCIe support of the host 610. The processor 611 and the I/O switches 620 and 630 may be connected by a PCIe link, and the I/O switches 620 and 630 and the plurality of I/O devices 640_1 to 640_*r* and 660_1 to 660_*s* and the storage devices 650 and 660 may be connected by a PCIe link. That is, the plurality of I/O devices 640_1 to 640_*r* and 660_1 to 660_*s* and the storage devices 650 and 660 may share the PCIe link of the host 610.

The plurality of I/O devices 640_1 to 640_*r* and 660_1 to 660_*s* may be GPUs, NPUs, TPUs, NICs, storage devices, or the like. For example, the tenant may use an AI function through an I/O device that is a GPU. The tenant may use a web search function through an I/O device that is an NIC.

The tenant may use the storage devices 650 and 660. For example, the tenant may read or delete data of the storage devices 650 and 660, or write data to the storage devices 650 and 660.

The storage devices 650 and 660 may be connected to the BMC 612. That is, the storage devices 650 and 660 may perform IB communication with the processor 611 and the I/O switches 620 and 630, and may perform OOB communication with the BMC 612.

The storage devices 650 and 660 may detect and respond to an attack of an attacking tenant by using the defense device 200 described with reference to FIG. 1 and FIG. 2, and may report it to the BMC 612. Here, the attack may be a side-channel attack.

The defense device 200 may detect and respond to a side-channel attack of the PCIe link to which it belongs. For example, when the defense device 200 is disposed in the storage device 650, the defense device 200 may detect and respond to the side-channel attack through the PCIe link between the processor 611 and the I/O switch 620. When the defense device 200 is in disposed the storage device 670, the defense device 200 may detect and respond to the side-channel attack through the PCIe link between the processor 611 and the I/O switch 630.

In one embodiment, the defense device 200 may notify the BMC 612 of attack information by using the command according to the NVMe-MI standard described with reference to FIG. 8. The attack information may include the presence of an attack, an attacker, an attack response method, and the like. The BMC 612 may send the attack information to the processor 611.

The processor 611 may determine whether the attacker determined by the defense device 200 is a real attacker. When the processor 611 determines that the attacker determined by the defense device 200 is a real attacker, the processor 611 may operate based on the defense policy. When the processor 611 determines that the attacker determined by the defense device 200 is not a real attacker, the processor 611 may ignore the notification of the defense device 200. At least one of the storage device 650 and the storage device 670 described with reference to FIG. 10 may be replaced with a memory device.

Figure 11:
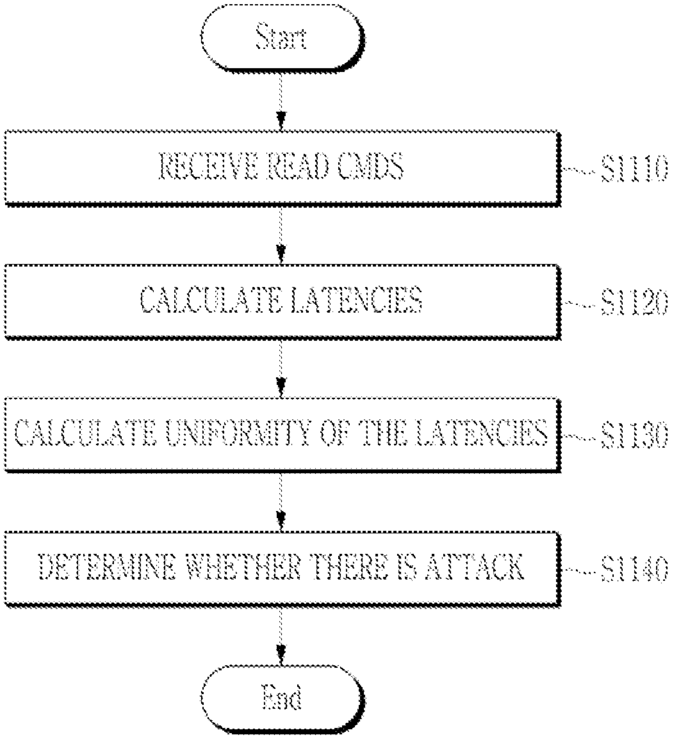
FIG. 11 illustrates a flowchart of an attack detection method according to an embodiment.

FIG. 11 illustrates a flowchart of an attack detection method according to an embodiment. The storage device may include a defense device that detects an attack. The storage device may be connected to the I/O switch together with other I/O devices. In one embodiment, the I/O switch and the storage device may be connected by a PCIe link, and the I/O switch and the I/O device may be connected by a PCIe link. The defense device may perform an attack detection method of FIG. 11. Here, the attack may be a side-channel attack on the I/O device.

The defense device may receive a read command from the host (S1110). The host may send the read command to the storage device through the I/O switch according to a request of the tenant. The host may send the read command to the storage device through the PCIe link. The read command may include a random read command, a sequential read command, a constant block read command, and the like.

When the read commands are continuously received for a predetermined period, the defense device may calculate the latency of each read command (S1120). The latency may correspond to a processing time of a command.

In one embodiment, the defense device may determine whether a transmission queue of the host is filled with a read command. When the transmission queue of the host is filled with the read command, the latency of each read command may be calculated.

In one embodiment, the latency of the read command may be defined based on four time points. The four time points may include (i) a time point at which the storage device receives the read command, (ii) a time point at which the storage device starts processing the read command, (iii) a time point at which the storage device completes processing of the read command, and (iv) a time point at which the read command processing result is sent to the host (a time point at which the host takes the read command processing result).

In one embodiment, a starting time point of the latency of the read command may be a time point at which the read command is received or a time point at which the read command is started to be processed. In one embodiment, an expiration time point of the latency of the read command may be a time point at which processing of the read command is completed or a time point at which the processing result of the read command is sent to the host.

In one embodiment, the latency of the read command may be defined as a time from a time point of receiving the read command to a time point of sending the processing result of the read command to the host. In one embodiment, the latency of the read command may be defined as a time from a time point at which processing of the read command is started to a time point at which processing of the read command is completed.

In addition, the defense device may exclude latency of a read command in which an internal operation of the storage device is performed during processing. The internal operation may include operations such as garbage collection and wear-leveling.

The defense device may calculate latencies for a plurality of read commands before the internal operation of the storage device occurs, or may calculate latencies for a plurality of read commands after the internal operation is completed. For example, the storage device may sequentially receive the first to tenth read commands, and may perform an internal operation at an arbitrary time point between a processing completion time point of the fourth read command and a processing starting time point of the sixth read command. The defense device may calculate the latencies of the first to fourth read commands, and/or may calculate the latencies of the sixth to tenth read commands.

The defense device may calculate uniformity of a plurality of latencies (S1130). The defense device may calculate uniformity of latencies of successive read commands. That is, when a write command or a delete command is included between the read commands, the defense device may not calculate uniformity.

The defense device may determine that there is an attack from the tenant when the uniformity is within a predetermined ratio (S1140). For example, the predetermined ratio may be 5%. That is, when a uniform latency is obtained for a predetermined time for successive read commands, the defense device may determine that there is an attack from the tenant. In addition, the defense device may detect the attack and determine the attacking tenant. When the defense device detects the attack, it may respond to the attack.

In one embodiment, when the defense device determines that there is an attack, the defense device may delay the latency of the command of the attacking tenant. The defense device may delay the latency based on a latency range of the attacking tenant. The latency range may include a minimum latency and a maximum latency. The defense device may determine the minimum latency and the maximum latency based on the service policy of the host.

In one embodiment, when the defense device determines that there is an attack, the defense device may adjust the priority of the attacking tenant. The priority may be related to the order in which commands are processed. The defense device may adjust the priority of the attacking tenant based on the latency range of the attacking tenant. For example, the defense device may adjust the priority of the attacking tenant within a range in which the latency of the command of the attacking tenant does not exceed the maximum latency.

Figure 12:
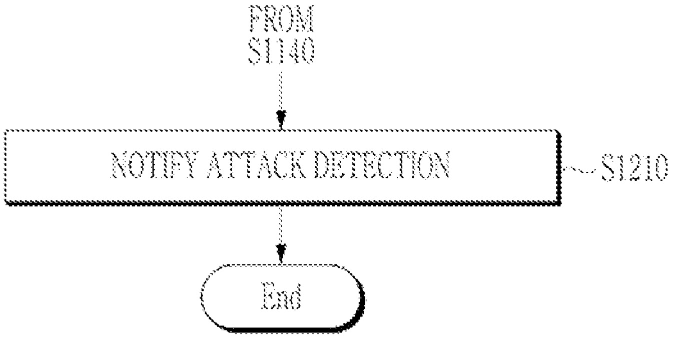
FIG. 12 illustrates a flowchart of an attack detection method according to an embodiment.

FIG. 12 illustrates a flowchart of an attack detection method according to an embodiment. In FIG. 12, after determining that there is an attack from the tenant (S1140), the defense device may notify the host that there is an attack (S1210). For example, the defense device may notify the BMC of the host that there is an attack. In this case, the defense device may notify the host by using the SMBus, the I2C protocol, or the I3C protocol. That is, the defense device may use the SMBus, I2C, or I3C port. The defense devices may use OOB communication to notify the host.

The defense device may notify the host by using the response command of the NVMe-MI standard. In one embodiment, the response command of the NVMe-MI standard may be a response to the NVM sub-system health status poll command. The defense device may notify the host of at least one of an attack detection command, a latency adjustment command, or a priority adjustment command by using the response command of the NVMe-MI standard.

Figure 13:
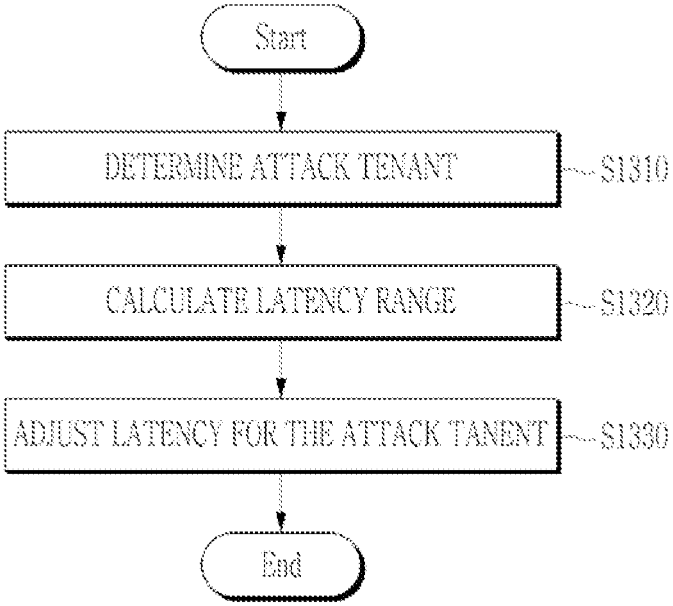
FIG. 13 illustrates a flowchart of an attack response method according to an embodiment.

FIG. 13 illustrates a flowchart of an attack response method according to an embodiment. In FIG. 13, when there is an attack, the defense device may determine an attacking tenant (S1310). In one embodiment, the defense device may determine that there is an attack when the transmission queue of the host is full of successive commands and is received. In one embodiment, the defense device may determine that there is an attack when the latency according to the successive commands has certain uniformity. The defense device may determine the attacking tenant who is the subject of the attack.

The defense device may calculate the latency range of the attacking tenant based on the service policy of the host (S1320). In one embodiment, the service policy of the host may include at least one of a tenant priority, a bandwidth, or a timeout limit. The latency range may include at least one of a minimum latency or a maximum latency. The defense device may calculate at least one of the minimum latency or the maximum latency of the attacking tenant, based on at least one of the tenant priority, the bandwidth, or the timeout limit.

For example, when the read command of the attacking tenant has a highest (first) priority, the defense device may determine the maximum latency of the attacking tenant to be within a latency of a second priority command. When the timeout limit of the attacking tenant is 10 seconds, the defense device may determine the maximum latency of the attacking tenant to be 10 seconds.

The defense device may adjust the latency for the attacking tenant based on the latency range (S1330). In one embodiment, the defense device may adjust the latency for the command of the attacking tenant within a range that does not exceed the maximum latency. In one embodiment, the defense device may adjust the latency for the command of the attacking tenant by adjusting the priority of the attacking tenant within a range that does not exceed the maximum latency.

Figure 14:
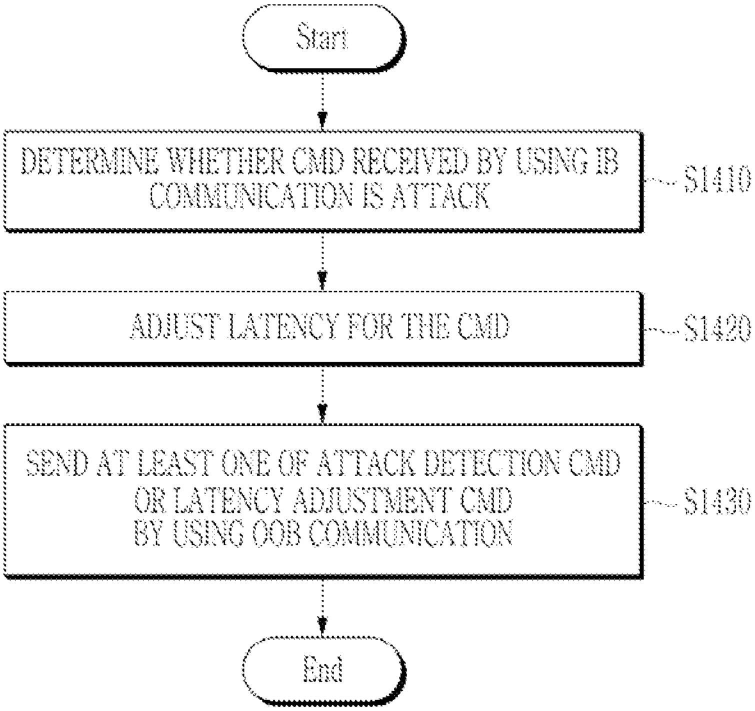
FIG. 14 illustrates a flowchart of an attack response method according to an embodiment.

FIG. 14 illustrates a flowchart of an attack response method according to an embodiment. In FIG. 14, the defense device may determine that the command received from the host is an attack by using IB communication (S1410). The IB communication may use a PCIe link.

The defense device may adjust the latency of the command (S1420). The defense device may adjust the latency according to the service policy of the host for the tenant.

The defense device may send at least one of an attack detection command, a latency adjustment command, or a priority adjustment command to the host by using OOB communication (S1430). The OOB communication may use one of a SMBus, an I2C protocol, or an I3C protocol. The defense device may send at least one of the attack detection command, the latency adjustment command, or the priority adjustment command to the BMC of the host.

The defense device may send at least one of the attack detection command, the latency adjustment command, and the priority adjustment command by using the response command of the NVMe-MI standard. In one embodiment, the response command of the NVMe-MI standard may be a response to the NVM sub-system health status poll command. At least one of the attack detection command, the latency adjustment command, or the priority adjustment command may occupy a reserved area in the response command.

In one embodiment, each component or a combination of two or more components described with reference to FIG. 1 to FIG. 14 may be implemented as a digital circuit, a programmable or non-programmable logic device or array, an Application Specific Integrated Circuit (ASIC), or the like.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. An operation method of a solid state drive, which is communicating with a host accessed by a tenant, the operation method comprising:

receiving, from the host, a plurality of read commands generated by the tenant;

calculating a plurality of latencies of the plurality of read commands, respectively;

calculating a uniformity of the plurality of latencies of the plurality of read commands that are successive and do not include a write command or a delete command;

determining, based on that the uniformity is within a predetermined ratio range, that there is a side channel attack from the tenant; and transmitting a notification of the side channel attack to the host, wherein the calculating of the plurality of latencies is performed based on a condition in which a transmission queue of the host is filled with the plurality of read commands.

2. The operation method of claim 1, wherein a first latency of the plurality of latencies is a time interval between:

a first time point when receiving a first read command of the plurality of read commands; and a second time point when sending a processing result of the first read command.

3. The operation method of claim 1, wherein a first latency of the plurality of latencies is a time interval between:

a third time point when processing a first read command of the plurality of read commands; and a fourth time point when a processing of the first read command is completed.

4. The operation method of claim 1, wherein the plurality of read commands are successive each other.

5. The operation method of claim 1, wherein the transmitting is performed based on a System Management Bus (SMBus), an Inter-Integrated Circuit (I2C) protocol, or an Improved Inter Integrated Circuit (I3C) protocol.

6. The operation method of claim 1, wherein the notification is configured to be provided to a Baseboard Management Controller (BMC) of the host.

7. The operation method of claim 1, wherein the notification has a form of a response of a Non-Volatile Memory Express-Management Interface (NVMe-MI) standard.

8. The operation method of claim 1, wherein the side channel attack is an attack for an input/output (I/O) device which is connected to the solid state drive through an I/O switch.

9. The operation method of claim 8, wherein:

the I/O switch and the solid state drive are connected by a first Peripheral Component Interconnect Express (PCIe) link, and the I/O switch and the I/O device are connected by a second PCIe link.

10. The operation method of claim 1, further comprising delaying a command latency of the tenant.

11. The operation method of claim 10, wherein the delaying comprises delaying the command latency based on a latency range of the tenant.

12. The operation method of claim 1, further comprising adjusting a priority of the tenant.

13. The operation method of claim 12, wherein the adjusting comprises adjusting the priority based on a latency range of the tenant.

14. An operation method of a solid state drive, which is communicating with a host accessed by a tenant, the operation method comprising:

determining, by the solid state drive, that a command, which is received from the host by In-Band (IB) communication, corresponds to a side channel attack;

based on a determination that the command correspond to the side channel attack, adjusting, by the solid state drive, a latency of the command for the tenant; and transmitting, by the solid state drive, a first notification indicating that the side channel attack has been detected and a second notification indicating that the latency of the command has been adjusted, to the host by Out-Of-Band (OOB) communication.

15. The operation method of claim 14, wherein:

the IB communication is performed based on a PCIe link, and the OOB communication is performed based on one of an SMBus, an Inter-Integrated Circuit (I2C) protocol, or an Improved Inter-Integrated Circuit (I3C) protocol.

16. The operation method of claim 14, wherein the transmitting comprises transmitting at least one of the first notification and the second notification in form of response of an NVMe-MI standard.

17. The operation method of claim 16, further comprising receiving a Non-Volatile Memory (NVM) sub-system health status poll command from a host device by the OOB communication, wherein the transmitting is performed in response to the NVM sub-system health status poll command.

18. A solid state drive included in a server, the solid state drive comprising:

an attack detector configured to determine an attacking tenant from among a plurality of tenants connected to a host based on a determination that a uniformity of a plurality of latencies of a plurality of read commands received from the host by In-Band (IB) communication is within a predetermined ratio range, the plurality of read commands are successive and do not include a write command or a delete command;

a budget calculator configured to calculate a latency range of the attacking tenant based on a service policy of the host; and a latency adjuster configured to adjust a latency for the attacking tenant based on the latency range, wherein the solid state drive is implemented as one of: a digital circuit, a programmable or non-programmable logic device or array, or an Application Specific Integrated Circuit (ASIC), wherein the service policy of the host comprises at least one of a tenant priority, a bandwidth, or a timeout limit, and wherein the latency range comprises at least one of a minimum latency or a maximum latency.

* * * * *